United States Patent
Eker et al.

(10) Patent No.: US 8,393,003 B2
(45) Date of Patent: Mar. 5, 2013

(54) OBFUSCATING COMPUTER PROGRAM CODE

(75) Inventors: Johan Eker, Lund (SE); Björn Johansson, Lund (SE); Carl Von Platen, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 408 days.

(21) Appl. No.: 12/515,280

(22) PCT Filed: Nov. 20, 2007

(86) PCT No.: PCT/EP2007/010018
§ 371 (c)(1),
(2), (4) Date: Apr. 9, 2010

(87) PCT Pub. No.: WO2008/074382
PCT Pub. Date: Jun. 26, 2008

(65) Prior Publication Data
US 2010/0199354 A1  Aug. 5, 2010

Related U.S. Application Data (60) Provisional application No. 60/882,622, filed on Dec. 29, 2006.

(30) Foreign Application Priority Data

Dec. 21, 2006  (EP) .................................... 06388070

(51) Int. Cl.
*G04F 7/04*  (2006.01)
(52) U.S. Cl. ........................ 726/26; 713/200; 713/194
(58) Field of Classification Search .................. 713/194, 713/200
See application file for complete search history.

(56) References Cited

U.S. PATENT DOCUMENTS 6,668,325 B1 * 12/2003 Collberg et al. .............. 713/194
2003/0093685 A1 * 5/2003 Tobin ........................... 713/200

FOREIGN PATENT DOCUMENTS

WO        99/01815 A   1/1999
WO   2008/074483 A1  6/2008

OTHER PUBLICATIONS

Chenxi Wang et al: "Software Tamper Resistance: Obstructing Static Analysis of Programs" Technical Report CS-2000-12, [Online] Dec. 2000, XP002437560, University of Virginia, US. Retrieved from the Internet: URL: http://citeseer.ist.psu.edu/wang00software.html>.
Collberg, C. and Thomborson, C. "Watermarking, Tamper-proofing, and Obfuscation—Tools for Software Protection", IEEE Transactions on Software Engineering, 28:6, Jun. 2002.
Ogiso, T. et al. "Software Obfuscation on a Theoretical Basis and its Implementation" IEICE Transactions on Fundamentals of Electronics, Communications and Computer Sciences, Engineering Sciences Society, Tokyo, JP, vol. E86-A, No. 1, Jan. 2003, pp. 176-186, XP009084952, ISSN 0916-8508.

(Continued)

*Primary Examiner* — Nathan Flynn
*Assistant Examiner* — Phuoc Tran
(74) *Attorney, Agent, or Firm* — Potomac Patent Group PLLC (57) ABSTRACT

A computer-implemented method of tamper-protecting computer program code. The method comprises: obtaining an input representation of the computer program code; identifying a conditional program statement for causing a data processing system to selectively execute one of at least a first and a second sets of program statements when said computer program is executed by a data processing system; replacing said identified conditional program statement and the first and second sets of program statements with a set of transformed program statements to obtain obfuscated program code, wherein the set of transformed program statements is adapted to cause the data processing system to execute at least a part of each of the transformed program statements when said computer program is executed by the data processing system.

14 Claims, 2 Drawing Sheets

OTHER PUBLICATIONS

Collberg, C. et al. "Dynamic Path-Based Software Watermarking" SIGPLAN Notices, vol. 39, Jun. 2004, pp. 107-118, XP009084970, US, ISSN: 0362-1340.

PCT International Search Report, mailed Feb. 26, 2008, in connection with International Application No. PCT/EP2007/010018.

PCT International Preliminary Report on Patentability, mailed Nov. 17, 2008, in connection with International Application No. PCT/EP2007/010018.

* cited by examiner

OBFUSCATING COMPUTER PROGRAM CODE

TECHNICAL FIELD

The invention relates to tamper protection of computer program code, e.g. source code or object code. More specifically, the invention relates to the tamper protection by obfuscating computer program code, in particular obfuscating the execution trace/control flow of a computer program code.

BACKGROUND

Software tampering is an attack which has the purpose of altering the way a piece of software operates in such a way that it brings illegitimate benefits to the attacker. The objectives of tampering could be to side-step copy protection or security mechanisms, to extract secret or copyrighted material, or to introduce malicious code such as computer viruses.

In many situations, the illegitimate benefits may involve substantial financial disadvantages for software producers. Consequently, both attackers and software vendors may be expected to make significant efforts to break and improve protection mechanisms against software tampering, respectively. In the context of mobile phones, protection of the SIM-lock and other sensitive software components, e.g. Digital Rights Management (DRM), are of particular interest. Furthermore, tamper protection of other software entities and/or for other purposes and/or in connection with other uses may also be beneficial.

In order to modify a software component, an attacker typically has to acquire at least a partial understanding of how the software component functions. Software tampering may thus be delayed if not prevented by making reverse engineering more difficult. Transformations, which make the software harder to analyze are useful to this end; such transformations are generally referred to as obfuscation.

Techniques for reverse engineering software may roughly be divided in two groups of techniques: Static (or "offline") code analysis and dynamic (or "live") code analysis. When performing dynamic analysis, the software is observed as it is executing. In contrast, static analysis is usually limited to an examination/analysis of some representation of the program code, without actually executing it. One technique employed in dynamic analysis is the comparison of execution traces.

An execution trace of a program typically includes the sequence of memory addresses from which the executable instructions are read during execution of a program. Execution traces may thus be collected by running the program, e.g. by using specific hardware support (so-called trace buffers) or by a software-based recording of the addresses. Using an execution trace and the executable code of the program, the actual sequence of executed instructions can thus be recreated.

By providing two sets of stimuli and comparing the differences in the resulting execution traces, an attacker can gain knowledge of the software component. In particular, comparison of execution traces may identify critical decision points of the program. In the context of the SIM-lock and DRM-solutions of mobile devices, tests for correct signatures or checksums are examples of critical decision points.

Previous attempts to make reverse engineering by dynamic analysis more difficult include attempts to limit the opportunities for an attacker to observe the program as it is executing. However, such counter-measures have generally been specific to a particular platform and/or a specific reverse-engineering tool, such as a specific debugger.

One example of such counter-measures includes encrypting the executable code and the use of specific hardware that combines decryption and execution of the code. Even though properly implemented hardware-based decryption techniques can offer good protection, this protection is achieved at the price of additional, specific hardware.

Another approach, known as anti-debugger techniques, has the purpose of complicating the process of observing the program execution in a particular debugger. On some platforms, the executing code can query the operating systems for a possible debugger that is attached to the process and e.g. terminate if this is the case. Another option is to interfere with the techniques used by the debugger, for instance by tampering with the setting of break points. However, anti-debugger techniques are specific to a particular debugger and do not provide a general purpose tamper protection technique. Furthermore, instruction-set simulators and hardware-supported debuggers are commonly used when debugging embedded systems, thus reducing the practical usefulness of anti-debugger techniques. Furthermore, execution traces may still be collected using trace buffers that are entirely implemented in hardware.

Obfuscation is a technique used to complicate code. Obfuscation makes code harder to understand when it is de-compiled, but it typically has no effect on the functionality of the code. Obfuscation of programs can be used to protect programs by making them harder to reverse-engineer.

The article "Watermarking, Tamper-proofing, and Obfuscation—Tools for Software protection" by Christian S. Collberg and Clark Thomborson, IEEE Transactions on Software engineering, 28:6 (June 2002), proposes an obfuscating transformation that introduces redundant if-statements. The condition of the if-statement is a so-called opaque predicate, which has some property that is known when the program is obfuscated but difficult to identify by static analysis of the code. Opaque predicates that always evaluate to e.g. TRUE may be used in such an if-statement. Consequently, at obfuscation time it is known that only one of the branches of the if-statement will be executed. Thus, during obfuscation the code to be executed may be inserted into that branch, while the other branch that is never executed may include some arbitrary "dummy" code. However, even though this technique makes the static analysis of the code harder, it does not efficiently increase the difficulty of a dynamic analysis attempting to identify critical decision points.

Hence, it remains a general problem to provide efficient methods of obfuscating program code so as to make it more difficult to analyse the execution trace of the program, e.g. in order to identify interesting decision and critical points.

SUMMARY

The above and other problems are solved by a computer-implemented method of tamper-protecting computer program code, the method comprising:

obtaining an input representation of the computer program code;

identifying a conditional program statement for causing a data processing system to selectively execute one of at least a first and a second sets of program statements when said computer program is executed by a data processing system;

replacing said identified conditional program statement and the first and second sets of program statements with a set of transformed program statements to obtain obfuscated program code, wherein the set of transformed program statements is adapted to cause the data processing system to execute at least a part of each of the transformed program statements when said computer program is executed by the data processing system.

Embodiments of the method described herein provide a transformation of the input representation, e.g. the source code, of a software component into obfuscated code in which differences in the execution trace are effectively hidden when executing the code with different inputs, thereby preventing critical decisions points from being easily detectable as differences in the execution traces when executing the software using different inputs.

Therefore, the initial phase of a tampering attack involving comparison of execution traces with the purpose of gaining knowledge of a software component is made considerably more difficult.

The transformation of the method described herein may be viewed as a substitution of differences in control-flow by differences in data-flow. It is thus an advantage of the method described herein that it renders the mere recording of the sequence of executed instructions insufficient in order to analyse the code. Instead, a portion of the program state is also needed in order to be able to identify differences.

The term "program statement" as used herein is intended to include a unit of structuring a programming language, in particular a minimal unit of such structuring. Examples of kinds of program statements include definitions, declarations, assignments, conditional statements, loops, and function/procedure calls. A conditional program statement general causes the program to selectively execute one of a set of alternative program branches. Each branch may include one or more program statements. Examples of conditional program statements include if-statements, case-statements or the like.

The term "expression" in a programming language as used herein is intended to include a combination of values, variables, and functions, etc., wherein the combination is interpreted according to the particular rules of precedence and of association for a particular programming language, which combination is adapted to produce and return a result, i.e. a value. An algebraic expression may produce a numeric result, e.g. a result having a numeric data type, e.g. a floating point data type or an integer data type. However, an algebraic expression may also produce a result of another data type, or a result that may be cast into another data type. A Boolean expression typically returns a value indicative of a true/false decision.

In some embodiments, the transformed program statements are adapted to cause the data processing system to produce the same program output as a combination of the identified conditional program statement and the first and second sets of program statements, when said program code is executed by said data processing system. Hence, the transformation of the program codes is semantic-preserving, i.e. has no influence on the program output created by the computer program.

The term "program output" as used herein is intended to include any observable behaviour during execution of the program, e.g. any program behaviour that is observable/noticeable by a user, by another computer program, by another device, or the like. Examples of program output include the output of numeric values, text output, binary output, output signals, visual, e.g. graphical, output, audible output, etc. that may be output via any suitable output device such as a computer screen, printer, storage medium, communications interface, etc., via a data interface, or the like.

In some embodiments, the set of transformed program statements includes/represents one or more guarded program statements, wherein each guarded program statement includes an action statement and a guard expression, and wherein the guarded program statement is adapted to cause a data processing system, when the program code is executed by the data processing system, to evaluate the guard expression to obtain a guard value, and to execute the action statement conditioned on the guard value. In one embodiment, each guarded program statement includes a single action statement.

Consequently, an efficient method is provided that ensures that the obfuscated code has the same effect/produces the same program output as the input code.

The guard for an action or conditional action statement may be a Boolean expression which represents the conditions under which the statement is executed. Hence, when control reaches the statement, the original statement is executed if and only if the guard evaluates to true (or another predetermined value).

The term "action statement" is intended to refer to a statement which causes some change in the state of the computation or produces some other side effect. Examples of action statements include assignments, memory read statements, memory write statements, procedure/function calls, etc.

When the method further comprises representing the guarded program statement as a sequence of unconditioned program statements, wherein the sequence of unconditioned program statements comprises an arithmetic expression including the guard expression, the execution trace is further obfuscated, since the guard statements are realised without an explicit condition statement, thus avoiding differences in the execution trace. Furthermore, a realisation of guarded statements is provided that does not rely on the presence of an instruction-set support for guarded statements.

In one embodiment, the arithmetic expression is adapted to cause the data processing system when the program code is executed by the data processing system to evaluate the arithmetic expression to one of two values conditioned on the guard expression.

In some embodiments, the method further comprises
  parsing at least one of the input representation and the transformed program statements so as to identify at least one of an equivalence operator, a logic operator, and a relational operator;
  replacing the identified equivalence, logic or relational operator with at least at least one of a corresponding predetermined arithmetic expression and a predetermined logic expression.

Consequently, the method avoids source language constructs that may after the control flow during the computation/evaluation of a condition, thereby further preventing differences in the control-dependence to show up as differences in the execution trace.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a RAM (Random Access Memory), from a storage medium or from another computer via a computer network. Alternatively, the described features may be implemented by hardwired circuitry instead of software or in combination with software.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

In particular, according to one aspect, a data processing system is suitably configured to perform the steps of the method described above and in the following.

According to another aspect, a computer program product comprises computer-executable instructions adapted to cause, when executed on a data processing system, the data processing system to perform the method described above and in the following. In some embodiments, the computer program product is embodied as a computer-readable medium having stored thereon the computer-executable instructions. For example, the computer-readable medium may be a compact disc (CD), an optical disc, a diskette, a magnetic storage medium, a memory stick, or the like, that has stored thereon the computer-executable instructions. For example, the computer-readable medium may have stored thereon a software application for tamper-protecting program code. In other embodiments, the computer program product is embodied as a data signal, e.g. a suitably modulated carrier signal. For example, the computer-executable instructions may be provided for download from a server computer via a computer network.

In some embodiments, the computer program product comprises a software compiler comprising functionality adapted to cause the data processing system to perform the method described above and in the following as one of a number of compilation passes performed by the compiler. Hence, an integrated software tool for tamper-protection and compilation is provided. Furthermore, since embodiments of the tamper protection described herein involves some of the same code analysis techniques for analysing source code as conventional compilers use, the corresponding software functionality may be reused, thereby providing an efficient software implementation.

For the purpose of the present description, the terms storage means/device and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
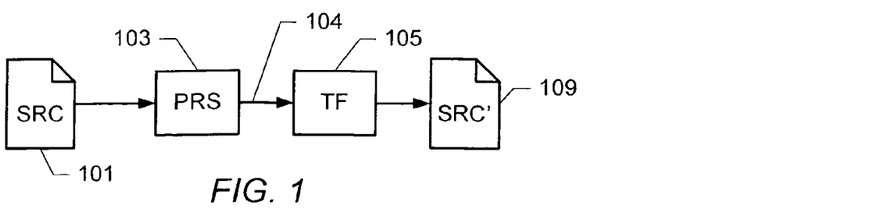
FIG. 1 shows a schematic block diagram of a process for tamper protecting program code.

FIG. 1 shows a schematic block diagram of a process for tamper protecting program code.

The process receives a source code 101. The source code 101 is typically in the form in which a computer program has been written by a programmer, typically in a formal programming language such as C, C++, Java, or the like. The source code can be automatically compiled by a compiler into object code or machine code or executed by an interpreter. The source code 101 may be represented as one or more text documents or as any other suitable digital representation. Alternatively, the tamper-protection process may receive a different type of input representation in which conditional program statements can be identified, e.g. object code.

The source code 101 is fed into a parser module 103. The parser module parses the source code and identifies one or more conditional program statements in the source code. The parser module may use any suitable technique for parsing a source code known in the art, for example a subset of the techniques used by conventional compilers when parsing source code as to identify the structural components of the corresponding programming language, such as variable definitions, constant definitions, functions, program statements, conditions, loops, assignments, expressions, etc. The parser may select all or just a subset of conditional program statements. For example, the parser may include a user interface allowing a user to manually select conditional statements to be transformed, e.g. conditional statements that are known to the user to be critical decision points for understanding security-sensitive program behaviour. Alternatively or additionally, the parser may select or deselect certain types of conditional statements, e.g. statements involving function calls in one of their branches. Which conditional statements are suitable for obfuscation may depend on the specific implementation of the tamper protection scheme described herein. The parser module forwards the identified conditional statements 104 and their respective branches of statements that are selectively executed conditioned on the conditional statement, or at least pointers to their respective locations in the source code, to a code transformation module 105.

The transformation module 105 transforms the identified conditional statements into sequences of statements causing reduced differences in the execution trace. In particular, the transformation module merges distinct execution paths of the input representation—e.g. the two alternative paths of an if-statement or another conditional statement—into a single sequence of "straight-line" code, also referred to as a basic block. The transformation module 105 replaces the conditional statements in the received source code by the transformed/obfuscated straight-line code, resulting in a transformed version 109 of the source code. The transformed source code 109 may subsequently be further processed, e.g. compiled, linked, compressed, encoded, and/or the like.

Figure 2:
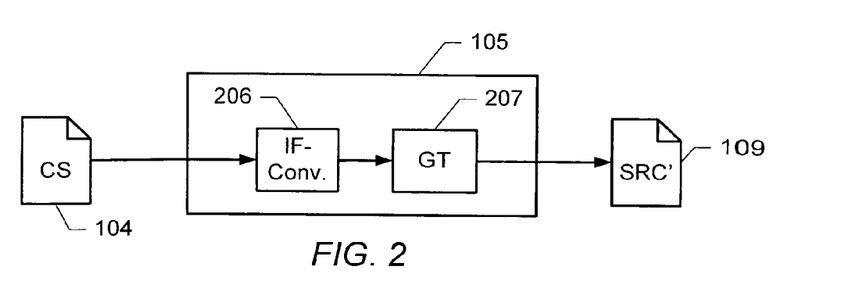
FIG. 2 shows a schematic block diagram of a transformation block.

FIG. 2 shows a schematic block diagram of a transformation block. As described above, the transformation block 105 receives one or more conditional statements 104 and generates straight-line code 109. The transformation includes an initial block 206 which replaces the conditional statement into a sequence of guarded statements. A subsequent guard transformation block 207 transforms each of at least a subset of the guarded statements into respective one or more program statements where the guard conditions are replaced by arithmetic expressions. It will be appreciated that the two blocks 206 and 207 may be implemented as distinct modules and executed as sequential steps, or they may be integrated in a single transformation step.

Figure 3:
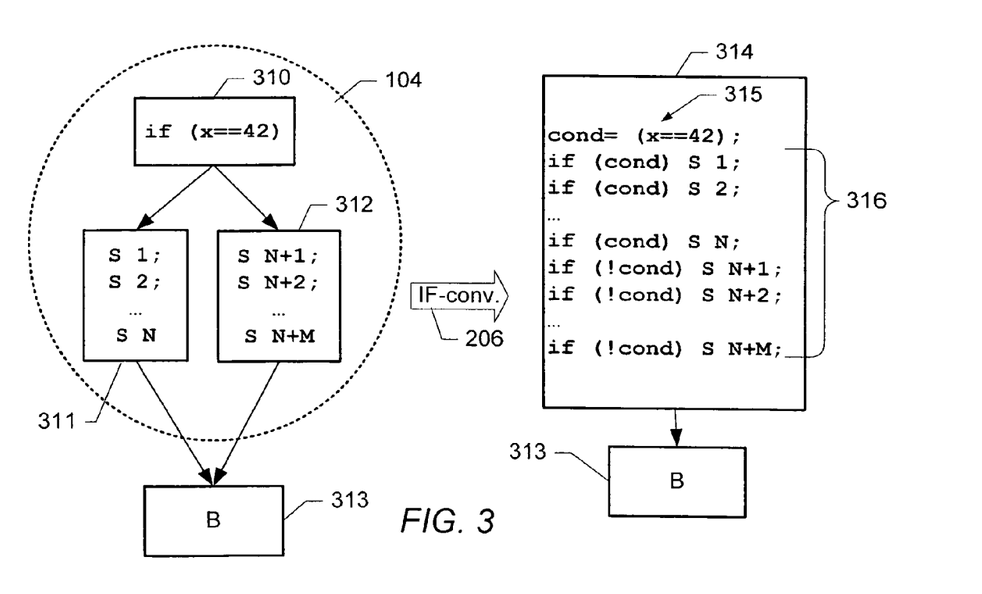
FIG. 3 schematically illustrates an example of an if-conversion

FIG. 3 schematically illustrates an example of a transformation of a conditional statement into a sequence of statements where each statement is executed at least partially. In general, the transformation 206 merges distinct execution paths into a single sequence of so-called straight-line code (basic block). The transformation 206 receives a section 104 of source code including a conditional statement 104. The conditional statement includes a condition 310 and two alternative sets of program statements 311 and 312, respectively. In the example of FIG. 3, the condition 310 simply tests whether a variable x is equal to a specified numerical value, in this example '42'. However, it will be appreciated that a large number of other conditions may be used as a part of a conditional statement. Typically, the condition of an if-statement includes a Boolean expression which can be evaluated to have the value TRUE or FALSE. Depending on whether the condition is fulfilled (TRUE) or not (FALSE), one of the alternative sets of program statements 311 and 312 is executed, while the respective other set is not executed, thus resulting in two distinct execution paths. After execution of one of the alternative sets of program statements the program flow continues at a subsequent program statement 313.

It is understood that there may be alternative types of conditional program statements. One alternative example includes a case-statement which includes a condition that, when evaluated, can assume one of a set of values. In particular, the condition of a case-statement may be an arithmetic expression that may have more than two values. Furthermore, a case-statement may include more that two alternative sets of program statements, and during execution one of these alternative sets of program statements is executed, depending on the value of the condition, thus resulting in a plurality of possible execution paths.

Still referring to FIG. 3, the transformation 206 transforms the conditional program statement 104 into a single sequence of program statements 314, so as to merge the different execution paths of the conditional statement 104 into a single path. In particular, the conversion 206 introduces a program statement 315 that assigns the value of the condition 310 to an auxiliary variable. In the example of FIG. 3, the auxiliary variable is a Boolean variable designated "cond." The statement 315 is followed by a sequence of further program statements 316.

Since it is generally desirable that the transformed program code 314 has the same effect as the original code and in particular results in the same program output, it is generally desirable that the transformation 206 be semantics-preserving. By merging distinct execution paths, the transformation 206 introduces additional effects during execution of the program, since the merged execution path includes the program statements of all the merged execution paths, in particular program statements such as function calls and other statements which, when executed, may cause effects such as updates of program variables, memory content, or other forms of changes in the global program state.

Program statements that have influence on the observable behaviour of the program will generally be referred to as critical statements, statements with critical side-effects, or action statements. For the purpose of the present description, the above terms are intended to include statements/instructions that have a direct or an indirect effect on the observable behaviour of the program, e.g. by directly or indirectly contributing/affecting another critical statement.

In order to avoid the introduction of undesired side-effects, the transformation 206 generates so-called guarded statements, where the action statement is guarded by a so-called guard or guard expression which makes the execution of the action statement conditioned on the value of the guard expression.

In the example of FIG. 3, the transformed program statements 316 are so-called guarded statements, i.e. they include a guard expression, in this example either "(cond)" or "(!cond)" making the execution of the respective action statement "S 1", . . . , "S N", "S N+1", "S N+M" conditioned on the value of the Boolean variable "cond" (here the operator "!" is the logical NOT operator). More specifically, in this example, all statements of the original set 311 of program statements are guarded by the expression (cond), i.e. they are only executed if the condition "cond" is TRUE (i.e. if x==42), while all statements of the original set 312 of program statements are guarded by the expression (!cond), i.e. they are only executed if the condition "cond" is FALSE (i.e. if x!=42).

Hence, when the transformed source code segment 314 is executed, each of the guarded program statements is executed at least in part. While some statements are completely executed, some are only executed to the extent that their respective guard expression is evaluated so as to determine whether or not to execute the corresponding action statement which is guarded by the guard expression. It will be understood that in some embodiments, not all program statements may need to be guarded. For example, the parser may be adapted to identify program statements that do not affect the global state or the observable behaviour of the program. Thus, such program statements do not require a guard. Examples of such statements include statements that only produce temporary results which may always be executed regardless of their control dependence.

For example, the transformation process may identify program statements that do not require a guard, e.g. by identifying critical statements including statements that directly or indirectly contribute to critical statements. Suitable methods for identifying such statements are known within the field of compilers, e.g. in the context of so-called dead-code elimination, e.g. as described in "Supercompilers for parallel and vector computers", by Hans Zima, p. 78, ACM Press, New York, USA, 1991, ISBN 0-201-17560-6.

Statements with a critical side-effect are generally guarded. Unless side-effect free, function calls are generally guarded. Modifications of the global state (e.g. assignment statements) are generally guarded, unless it can be determined that they do not contribute to the effect of the program/program output. Furthermore, guards are used to assure that exceptions are not introduced by the transformation. For example, memory reads are generally guarded unless the memory address is always known to be valid. Certain arithmetic operations, like division, may also introduce exceptions and are thus guarded.

The removal of guards may be illustrated by the following non-limiting example, in which the program code segment

```
if (x==42) {
    t1 = 2*i;
    t2 = j + t1;
    j = t2;
}
else
```

-continued

```
{
    t3 = i + 1;
    i = t3;
}
``` is transformed into the following sequence of program statements:

cond=(x==42);

if (cond) t1=2*i;

if (cond) t2=j+t1;

if (cond) j=t2;

if (!cond) t3=i+1;

if (!cond) i=t3;

Assuming that no other statements in the program depend on t1, t2, and t3, the transformation process may remove the guards from some of the statements, as illustrated by the following code segment:

cond=(x==42);

t1=2*i;

t2=j+t1;

if (cond) j=t2;

t3=i+ if (!cond) i=t3;

In the example of FIG. 3, it is assumed that all of the statements "S 1", . . . , "S N", "S N+1", . . . , "S N+M" affect the global state and are therefore guarded.

The example of a transformation 206 described in connection with FIG. 3 is referred to as "if-conversion". If-conversions as such are known, see e.g. "Conversion of control dependence to data dependence", by J. R. Allen et al., POPL'83: Proceedings of the 10$^{th}$ ACM SIGACT-SIGPLAN symposium on principles of programming languages, Austin, Tex., 1983, pp. 177-189). However, in contrast to the method disclosed herein, they have previously been used in the context of program code vectorization so as to allow for parallel execution of vector operations, rather than in the context of tamper protection so as to hide differences in execution traces that are caused by critical decision points. In one embodiment, the process 206 includes an initial if-conversion resulting in a merged basic block wherein all statements are guarded. In a subsequent step the process identifies program statements in which the guard statement may be removed, since the statements, when unguarded, do not have (or directly or indirectly contribute to) any critical side effects. The process may then remove the guard expression from the identified program statements.

Again referring to FIG. 2, the output from the transformation block 206 including guarded program statements is fed into a guard transformation block 207 which transforms the guarded program statements into arithmetic operations so as to avoid representing the guards as conditional statements. Hence, the output 109 of the guard transformation block 207 includes source code in which the evaluation of conditions is implemented without introducing differences in the execution trace.

To this end, the guard transformation block 207 parses the guarded statements generated by the transformation block 206 and detects the respective conditions and action statements. Subsequently, the guard transformation block 207 transforms the condition into an arithmetic expression. For example the arithmetic expression may evaluate to one of a set of predetermined alternative values depending on the value of the original condition. In particular, the transformation block may generate an assignment statement where the result of the arithmetic expression is assigned to a temporary/auxiliary variable.

In the following, examples of representations of guarded statements will be described. For example, for the purpose of the present description it is assumed that cond is a temporary result which denotes a condition and is either 0 (false) or 1 (true). Further it is assumed that t1 and t2 are temporary results that can be evaluated without risk of altering the effect of the program. In particular, no critical side-effect or exception is assumed to be caused by their evaluation. Let the following expression, which whose value is either t1 or t2 depending on the condition cond, be denoted by IF:

$$IF(cond, t1, t2) = cond*t1 + (1-cond)*t2.$$

Hence, if cond=0, then IF(cond, t1, t2)=t2, and if cond=1, then IF(cond, t1, t2)=t1. This allows us to realize guarded statements as summarised in table 1 below.

TABLE 1

Realisation of some guarded statements that avoid introduction of differences in the execution trace.

| Type of statement | guarded statement | realisation without guard |
|---|---|---|
| Memory read | if (cond) t4=*t1 | t2=&dummy;<br>t3=IF(cond,t1,t2);<br>t4=*t3; |
| Memory write | if (cond) *t2=t1 | t3=&dummy;<br>t4=IF(cond,t2,t3);<br>*t4=t1; |
| Division | if (cond) t5=t1/t2 | t3= <non-zero expression>;<br>t4=IF(cond,t2,t3);<br>t5=t1/t4; |

Generally, table 1 includes examples of statements that are critical due to the risk of exceptions. In general, memory read and write statements may cause exceptions (protection faults etc.), unless the destination address is known to be valid on both execution paths. Divisions may also cause an exception (division by zero). It will be appreciated that there may be further examples of critical statements.

Table 1 further illustrates how the guard condition can be removed even for critical statements by replacing the guard condition with an arithmetic expression. For memory read/write, the process may provide a safe address (referred to by "&dummy" in the example of table 1) so-as to avoid undesired side effects in case the read/write statement would not have been executed in the original code. Similarly, in the case of a division, the process may provide a non-zero dividend. It is further noted that the dummy variable also avoids an undesired update of the program state (memory write).

In table 1, t1 through t5 are assumed to be temporary results which can be evaluated without side effects, dummy is a variable with address &dummy that douse not affect the outcome of the program. In general, the prefix "*" is an operator indicating the value stored at the address corresponding to the prefixed (pointer) variable, e.g. 11 denotes the value stored at the address t1. Similarly the pre-fix "&" of a variable denotes the address at which the value of that variable is stored in memory.

In particular, since the variables t1-t5 in Table 1 are temporary variables, removing the guard does not change the semantics of the program. For instance, in the guarded memory read statement:

if (cond)*t*4=*\*t*1 t4 is a temporary value that is not used if (!cond). Further, the added computations of t2 and t3 are only used locally in the computation of t3 and t4, respectively.

It will be appreciated that alternatively or additionally, other program transformations may be employed to remove the guard condition, e.g. by introducing a redundant assignment ("variable=variable"), when a guarded assignment is not supposed to be executed, e.g. by transforming if (cond) variable=value;

into t1=IF(cond, value, variable); variable=t1;

If the guarded statement includes a guarded function call, e.g. "if (cond) y=f(x)", there are several options as to how the guard transformation block 207 may represent this guarded statement:

If the guard transformation block has access to the source code of the called function (e.g. because it is defined in the set of source code modules received by the tamper-protection process), the guard transformation block may inline the function body of the called function at the call site. In one embodiment, this in-lining may be performed by the initial transformation block 206, and the in-lined function body may then be transformed into a sequence of guarded program statements as described above.

In an alternative embodiment, the process may clone the entire function and introduce the guard as an extra parameter. For example, if-conversion of the following code segment:

```
f (int *p) {
    *p = 0;
}
```

Results in the following transformed code segment:

```
f(int *p, int guard) {
    if (guard) *p = 0;
}
```

The guard condition may then be replaced as follows:

```
f(int *p, int guard) {
    t2 = IF(guard,p,&dummy);
    *t2 = 0;
}
```

The function ƒ can thus be called with guard=0 as its second parameter so as to avoid execution of the undesired critical statement (*p=0).

As yet another alternative, the process may introduce an auxiliary function which has no useful effect (e.g. a function with an empty function body), and employ the if-conversion described above to the function call.

For example, the transformation process may select one of the above alternatives based on e.g. the size of the function. For functions smaller than a predetermined limit, the process may select one of the first two options, so as to avoid differences in the execution trace, and for larger functions the process may select the third alternative, so as to limit the growth of the resulting source code.

Hence, in the above an example has been described of a representation of a guarded statement by a set of unguarded statements wherein the guard expression is represented as an arithmetic expression. In the above example, it was assumed that the conditions are represented by 0 and 1. It will be understood, however, that alternative representations of conditions may be used. For example negative values may denote TRUE and positive values FALSE. Examples of other representations that may be used in connection with the method described herein are listed in table 2.

In general, conditions can be represented using some set of values, $D = F \cup T$, where F and T are disjunct, non-empty subsets of D. The representation may be represented by a predicate $p: D \rightarrow \{0, 1\}$, such that $p(t)=1$ and $p(f)=0$ for each $t \in T$, $f \in F$. It is noted that any subjective mapping from a domain, D, to the Boolean values $\{0,1\}$ defines a representation that may be used in connection with the method described herein. It will be appreciated that for each representation, there is a dual representation, in which the interpretation of the subsets F and T is interchanged.

Hence, in general, encodings of conditions may be represented by a predicate p which is a mapping from some domain, D, to the Boolean value $\{0,1\}$. In addition to the Boolean values $\{0,1\}$, examples of alternative encodings include the use of the sign-bit (e.g. such that negative represents TRUE) and to let the uniform bit pattern 11 ... 111 (i.e. the value −1 in two-complement) denote true.

TABLE 2

Examples of encodings of conditions.

| Domain | Predicate | representation of FALSE | representation of TRUE |
|---|---|---|---|
| $\{0,1\}$ | Identity on $\{0,1\}$ | 0 | 1 |
| $\{-2^{B-1}, -2^{B-1}+1,...,2^{B-1}-1\}$ | x=0 | 0 | Any x; x ≠ 0 |
| $\{-2^{B-1}, -2^{B-1}+1,...,2^{B-1}-1\}$ | x<0 | Any x; x ≧ 0 | Any x; x < 0 |
| $\{-1,0\}$ | −x | 0 | −1 |
| Some set D | $p: D \rightarrow \{0, 1\}$ | Any x; p(x) = 0 | Any x; p(x)=1 |

Figure 4:
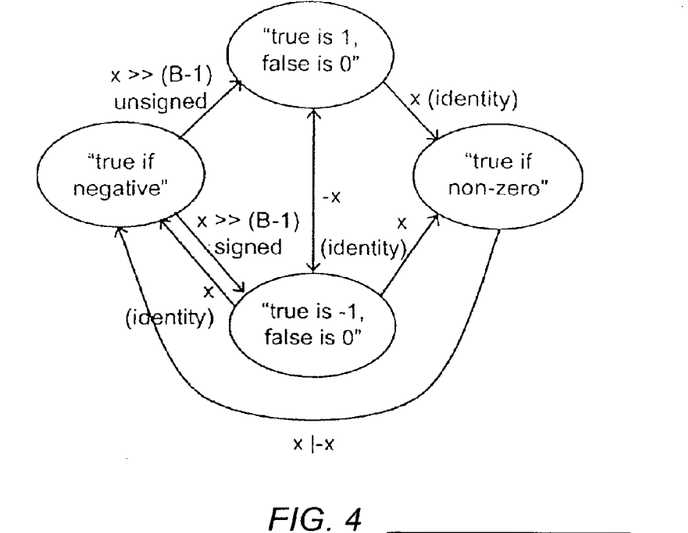
FIG. 4 schematically illustrates examples of conversions between examples of different encodings of conditions.

In order to mix different representations, it may be useful in some embodiments to provide conversions between the above representations, as illustrated in FIG. 4. FIG. 4 schematically illustrates conversions between some of the representations listed in table 2 above. Here and in the following, B denotes the bit-width of an integer data type that represents conditions (e.g. that is used as domain D). Unsigned (logical) shift right by B-1 has the range $\{0,1\}$ whereas signed (arithmetic) shift right by B-1 results in either of the bit patterns 00 . . . 0 or 11 . . . 1.

For example, while table 3 employs a zero/non-zero representation for equalities and inequalities, tables 4-6 below employ negative/non-negative representations for comparisons. An example of a conversion of an expression including both types of operators (e.g. "(x==42)&&(y<100)") may include a conversion to a common representation and to perform a bitwise AND.

Again referring to FIG. 2, the guard transformation block 207 may further substitute some or all equivalence operators (== and !=), relational operators (<, <=, >= and >) and logic operators (&&, II and !=) with respective arithmetic expressions that do not affect the flow of control when evaluated. This has the advantage of avoiding source-language constructs that alter control-flow when computing the conditions, thereby preventing differences in control-dependence from showing up as differences in the execution trace.

In the following, examples of suitable arithmetic expressions for representing equivalence, relational, and logic operators will be described.

Equivalence Operators:

Testing two integers for equality may be realized as a subtraction. The difference between x and y is zero if and only if x=y. Since non-equality is the dual relation of equality, testing inequality can be realized in the same way, but by interpreting the result differently. In this case zero denotes false and a non-zero result means true.

Alternatively, the test for equality (non-equality) can be realized using the exclusive-or operator: x and y are equal if and only if the result is zero. Table 3 summarizes examples of transformations of the equivalence operators.

TABLE 3

Two examples of representations of equivalence relations by subtraction and exclusive-or ( ˆ ), respectively, and the resulting representation of the condition.

| Original source | Transformed source | Representation of TRUE | Representation of FALSE |
|---|---|---|---|
| (x==y) | cond = x−y | $\{0\}$ | $\{1,2,...,2^B−1\}$ |
| (x!=y) | cond = x−y | $\{1,2,...,2^B−1\}$ | $\{0\}$ |
| (x==y) | cond = xˆy | $\{0\}$ | $\{1,2,...,2^B−1\}$ |
| (x!=y) | cond = xˆy | $\{1,2,...,2^B−1\}$ | $\{0\}$ |

Relational Operators:

The relational expression x<y can be tested using subtraction, given that the difference x−y can be evaluated without the risk of overflow. In this case the condition is true if and only if x−y is negative. If x,y∈[a,b] then ab≦y−x≦b−a, which means that the difference can be represented as a signed B-bit machine word if b−a is less than $2^{B-1}$.

For integers, y>x is the same condition as x<y, which means that the same difference and representation of the condition can be used. Further, x≧y is the dual of x<y, which means that it can be evaluated using the same difference and by interchanging the meaning of the sets T and F, as described above. The fourth relational operator, "≦", can be evaluated in the same way: y≦x is the same condition as x≧y.

It is also possible to compute the difference using a data type that has an extended range (using multiple machine words). In this case, it is sufficient to use the most significant word of the difference, since it contains the sign-bit, which holds the relevant piece of information.

A third alternative is to detect the cases in which there is a risk of overflow, and to adjust the result accordingly. Firstly, it may be noted that there is no risk of overflow, if both operands have identical most significant bits (msb), since their difference, x−y, is then necessarily in the range $[-2^{B-1}+1, 2^{B-1}-1]$. Furthermore, if the most significant bits differ, it is sufficient to compare the msb's only. If x and y are unsigned entities then the argument with the msb set is the greatest. In a signed representation, where the msb is the sign-bit, the argument with that bit cleared is the greatest. Table 4 summarises the above examples of realizations of relational operators.

TABLE 4

Examples of realizations of the relational operators by subtraction given a sufficient range to represent the difference, z (no risk of overflow).

| Original source | Transformed source | Representation of TRUE | Representation of FALSE |
|---|---|---|---|
| (x<y) | z = x−y | $\{-2^{B-1}, -2^{B-1}+1,...,-1\}$ | $\{0,1,2,...,2^{B-1}-1\}$ |
| (x>y) | z = y−x | $\{-2^{B-1}, -2^{B-1}+1,...,-1\}$ | $\{0,1,2,...,2^{B-1}-1\}$ |
| (x>=y) | z = x−y | $\{0,1,2,...,2^{B-1}-1\}$ | $\{-2^{B-1}, -2^{B-1}+1,...,-1\}$ |
| (x>=y) | z = y−x | $\{0,1,2,...,2^{B-1}-1\}$ | $\{-2^{B-1}, -2^{B-1}+1,...,-1\}$ |

To detect the risk of overflow, the guard transformation process may compute w=xˆy (exclusive-or). The msb of w is set when the corresponding bits of x and y differ. Remaining bits of w have no significance.

If there is no risk of overflow, the previous method of computing the condition x<y by evaluating x−y can be used. If, however, the msb's do differ, the guard transformation process may use the most significant bit of y when comparing unsigned integers and the sign-bit of x when comparing signed integers. This can be summarized in the following formulas for unsigned comparison z=(x−y)&~w|y&w, and for signed comparison z=(x−y)&~w|x&w, respectively.

TABLE 5

Examples of realizations of the relational operators (unsigned arguments) that handle overflow when subtracting the arguments.

| Original source | Transformed source | Repr. of TRUE | Repr. of FALSE |
|---|---|---|---|
| (x<y) | w = xˆy; z = (x−y) & ~w \| y & w; | $\{-2^{B-1}, -2^{B-1}+1, ...,-1\}$ | $\{0,1,2, ...,2^{B-1}-1\}$ |
| (x>y) | w = xˆy; z = (y−x) & ~w \| x & w; | $\{-2^{B-1}, -2^{B-1}+1, ...,-1\}$ | $\{0,1,2, ...,2^{B-1}-1\}$ |

TABLE 5-continued

Examples of realizations of the relational operators (unsigned arguments) that handle overflow when subtracting the arguments.

| Original source | Transformed source | Repr. of TRUE | Repr. of FALSE |
|---|---|---|---|
| (x>=y) | w = x ^ y; z = (x-y) & ~w \| y & w; | {0,1,2, ...,$2^{B-1}-1$} | {$-2^{B-1}, -2^{B-1}+1$, ...,-1} |
| (x>=y) | w = x ^ y; z = (x-y) & ~w \| x & w; | {0,1,2, ...,$2^{B-1}-1$} | {$-2^{B-1}, -2^{B-1}+1$, ...,-1} |

TABLE 6

Examples of realizations of the relational operators (signed arguments) that handle overflow when subtracting the arguments.

| Original source | Transformed source | Repr. of TRUE | Repr. of FALSE |
|---|---|---|---|
| (x<y) | w = x ^ y; z = (x-y) & ~w \| x & w; | {$-2^{B-1}, -2^{B-1}+1$, ...,-1} | {0,1,2, ...,$2^{B-1}-1$} |
| (x>y) | w = x ^ y; z = (y-x) & ~w \| y & w; | {$-2^{B-1}, -2^{B-1}+1$, ...,-1} | {0,1,2, ...,$2^{B-1}-1$} |
| (x>=y) | w = x ^ y; z = (x-y) & ~w \| x & w; | {0,1,2, ...,$2^{B-1}-1$} | {$-2^{B-1}, -2^{B-1}+1$, ...,-1} |
| (x>=y) | w = x ^ y; z = (x-y) & ~w \| y & w; | {0,1,2, ...,$2^{B-1}-1$} | {$-2^{B-1}, -2^{B-1}+1$, ...,-1} |

Logical Operators:

In some programming languages, e.g. in the C programming language, the logical operators "&&" (and) and "II" (or) are evaluated in a fashion that is sometimes referred to as Boolean short-circuiting. For examples, the second argument of "&&" is not evaluated unless the first one evaluated to TRUE. Since x && y is known to be false if x is false, irrespective of the value of y). The change of control flow resulting from typical implementations of the above short-circuiting may be avoided by evaluating conditions as arithmetic expressions.

For example, assuming that the evaluation of y has no side-effects, it is possible to evaluate the condition x && y as an arithmetic expression: Given a normal Boolean representation, the "&"-operator (bitwise and) and the "*"-operator (integer multiplication) may be used as a possible realization, since both of them evaluate to true ("1") if and only if both x and y are TRUE, and FALSE ("0") otherwise.

It will be appreciated that corresponding expressions can be defined for the other logical operators and for other representations of conditions.

If the evaluation of y does have side effects, its execution may be guarded as a result of the if-conversion, as described above.

Figure 5:
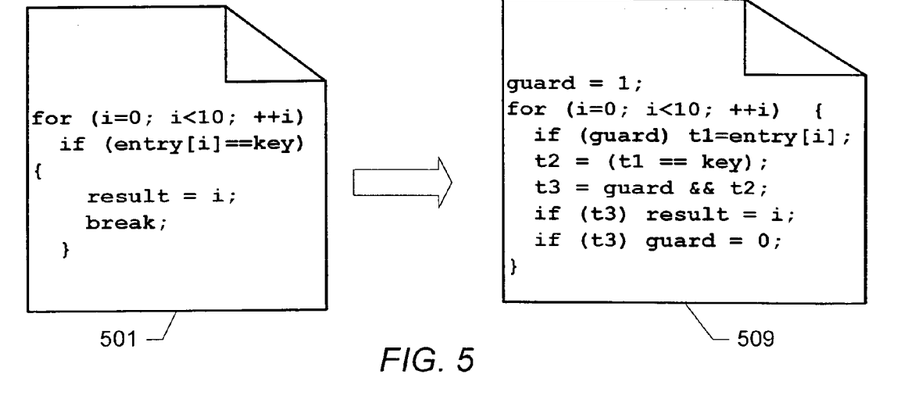
FIG. 5 illustrates an example of an if-conversion applied to a program loop.

FIG. 5 illustrates an example of an if-conversion applied to a program loop. If-conversion can be extended to handle a number of loops. If the number of loop iterations is bounded (and the bound is reasonably low) it is possible to convert early loop exits using guards that are called exit flags. In one embodiment, all action statements of the loop are guarded by a guard expression. Upon entry into the loop, the guard condition is set to TRUE, and when an early loop exit is to be executed, the guard condition is set to FALSE. FIG. 5 shows a code segment 501 including a for-loop which in turn includes a break statement. The transformation process transforms this code segment into the transformed code segment 509, wherein the early loop exit is controlled by the guard expression guard. Hence, in an embodiment including loop conversion, a loop may be executed the same number of times regardless of the control dependence of the code prior to transformation.

Figure 6:
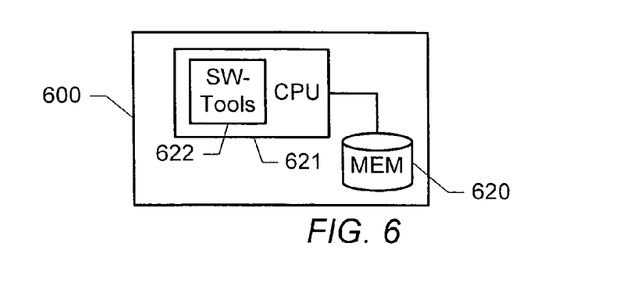
FIG. 6 shows a schematic block diagram of a system for tamper-protecting program code.

FIG. 6 shows a schematic block diagram of a system for tamper-protecting program code. The system comprises a data processing system 600, e.g. a computer such as a PC. The data processing system includes a processing unit 621, e.g. a microprocessor such as a CPU of a computer. The processing unit 621 is connected to a storage device 620, such as a hard disk, a memory card interface, an optical disk device, or the like. The processing unit 621 is suitably programmed to execute an automated software tool 622, such as a source-to-source transformer. For example, the automated software tool 622 may be adapted to cause the processing unit 621 to load the input representation, e.g. the source code, of the program code from the storage device 620, and the steps of the method described herein may be performed automatically by said processing unit. The processing unit 621 may then store the transformed source code on the storage device 620. Alternatively, the processing unit may make the transformed source code available to other programs executed on the data processing systems, e.g. a compiler, and/or output the result via another suitable interface. In yet an alternative embodiment, the automated software tool may process, e.g. compile, the transformed source code directly.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A computer-implemented method for tamper-protecting computer program code, the method comprising:
   obtaining, by the computer, an input representation of the computer program code;
   identifying, by the computer, a conditional program statement for causing a data processing system to selectively execute one of at least a first set and a second set of program statements when the computer program code is executed by a data processing system, the conditional program statement including a condition; and
   replacing the identified conditional program statement and the first and second sets of program statements with a set of transformed program statements to obtain obfuscated program code;
   wherein the set of transformed program statements is adapted to cause the data processing system to execute at least a part of each of the transformed program statements when the computer program code is executed by the data processing system; and
   replacing comprises merging distinct execution paths into straight-line code by conditioning execution of each program statement of the first set of program statements on the condition included in the identified conditional program statement and by conditioning execution of each program statement of the second set of program statements on the condition not being fulfilled.

2. The method of claim 1, wherein the set of transformed program statements is adapted to cause the data processing system to produce the same program output as the identified conditional program statement and the first and second sets of program statements when the program code is executed by the data processing system.

3. The method of claim 1, wherein the set of transformed program statements includes at least one guarded program statement, each guarded program statement includes an action statement and a guard expression, and the guarded program statement is adapted to cause the data processing system, when the program code is executed by the data processing system, to evaluate the guard expression to obtain a guard value and to execute the action statement conditioned on the guard value.

4. The method of claim 3, wherein each guarded program statement includes a single action statement.

5. The method of claim 3, further comprising representing a guarded program statement as a sequence of unconditioned program statements, wherein the sequence of unconditioned program statements comprises an arithmetic expression including the guard expression.

6. The method of claim 5, wherein the arithmetic expression is adapted to cause the data processing system, when the program code is executed on the data processing system, to evaluate the arithmetic expression to one of at least two-values conditioned on the guard expression.

7. The method of claim 3, further comprising representing a guard expression by a predicate, wherein the predicate is a subjective mapping from a domain to a Boolean value.

8. The method of claim 3, wherein the guard expression is indicative of a Boolean expression.

9. The method of claim 1, further comprising:
parsing at least one of the input representation and the transformed program statements so as to identify at least one of an equivalence operator, a logic operator, and a relational operator; and
replacing the identified equivalence, logic, or relational operator with at least one of a corresponding predetermined arithmetic expression and a predetermined logic expression.

10. The method of claim 1, wherein the input representation Includes at least one input source code module.

11. The method of claim 1, wherein the obfuscated program code includes at least one transformed source code module.

12. A data processing system configured to perform the steps of the method of claim 1, wherein the data processing system includes at least one electronic processor.

13. A non-transitory computer-readable medium encoded with a computer program for tamper-protecting computer program code, wherein the computer program when executed causes the computer to perform a method comprising:
obtaining an input representation of the computer program code;
identifying a conditional program statement for causing a data processing system to selectively execute one of at least a first set and a second set of program statements when the computer program code is executed by a data processing system, the conditional program statement including a condition; and
replacing the identified conditional program statement and the first and second sets of program statements with a set of transformed program statements to obtain obfuscated program code;
wherein the set of transformed program statements is adapted to cause the data processing system to execute at least a part of each of the transformed program statements when the computer program code is executed by the data processing system; and
replacing comprises merging distinct execution paths into straight-line code by conditioning execution of each program statement of the first set of program statements on the condition included in the identified conditional program statement and by conditioning execution of each program statement of the second set of program statements on the condition not being fulfilled.

14. The non-transitory computer-readable medium of claim 13, wherein the computer readable medium is further encoded with a software compiler adapted to cause the data processing system to perform the method as one of a number of compilation passes performed by the computer in executing the software compiler.

* * * * *

UNITED STATES PATENT AND TRADEMARK OFFICE
CERTIFICATE OF CORRECTION

PATENT NO. : 8,393,003 B2
APPLICATION NO. : 12/515280
DATED : March 5, 2013
INVENTOR(S) : Eker et al.

Page 1 of 1

It is certified that error appears in the above-identified patent and that said Letters Patent is hereby corrected as shown below:

In the Specification:

In Column 4, Line 49, delete "after" and insert -- alter --, therefor.

In Column 7, Line 35, delete "more that" and insert -- more than --, therefor.

In Column 8, Line 13, delete ""S N+1", "S N+M"" and insert -- "S N+1", …, "S N+M" --, therefor.

In Column 9, Line 32, delete "t3=i+" and insert -- t3=i+1; --, therefor.

In Column 10, Line 67, delete "e.g. 11" and insert -- e.g. *t1 --, therefor.

In Column 14, Line 2, delete "ab≤y-x" and insert -- a-b≤y-x --, therefor.

In the Claims:

In Column 18, Line 2, in Claim 10, delete "Includes" and insert -- includes --, therefor.

Signed and Sealed this
Sixteenth Day of July, 2013

Teresa Stanek Rea
*Acting Director of the United States Patent and Trademark Office*